March 28, 1939.   P. RASMUSSEN   2,152,500
FLOUR DUSTING MACHINE
Filed March 29, 1938   2 Sheets-Sheet 1
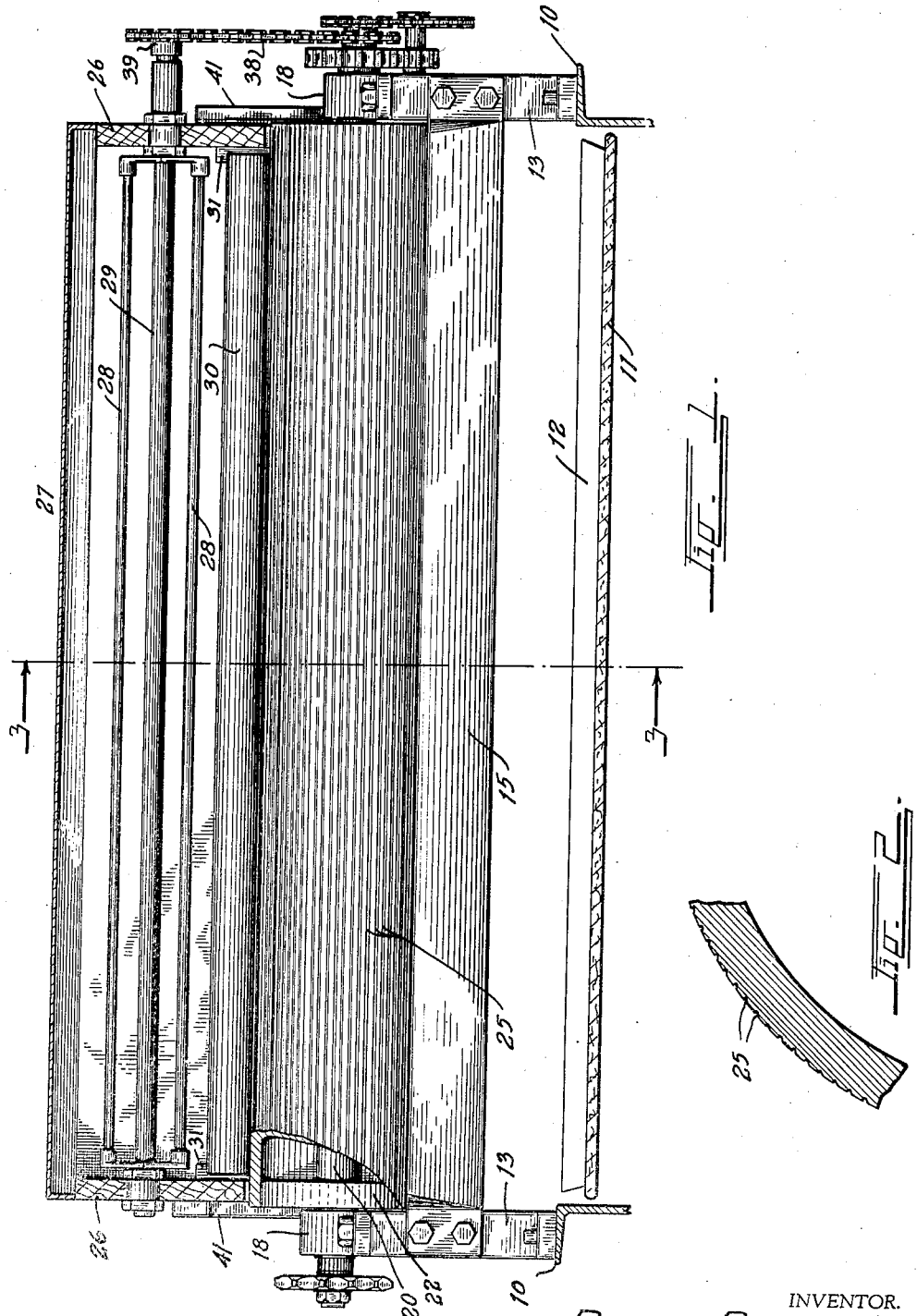
INVENTOR.
PETER RASMUSSEN
BY
ATTORNEY.

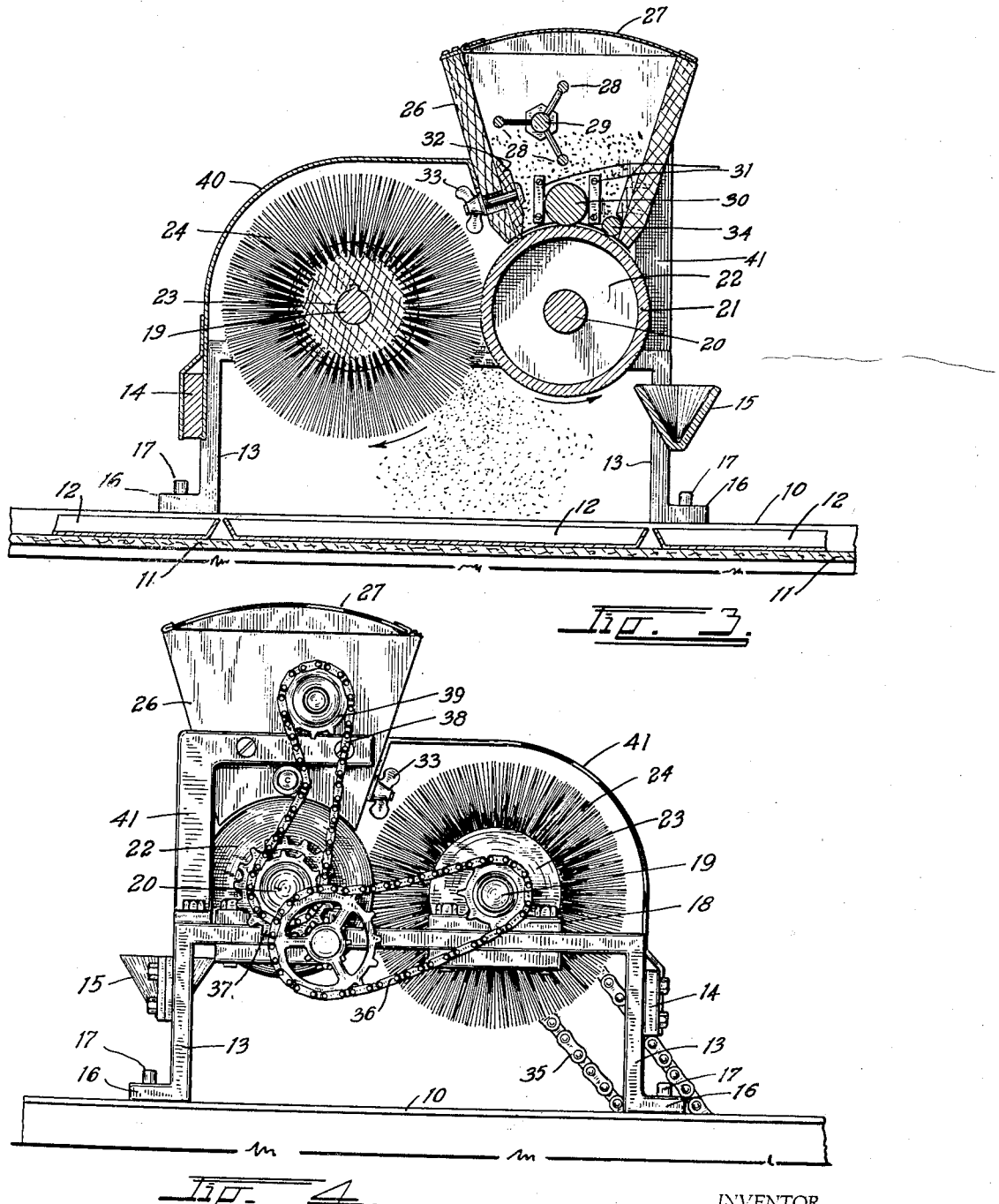

Patented Mar. 28, 1939

2,152,500

UNITED STATES PATENT OFFICE 2,152,500

FLOUR DUSTING MACHINE

Peter Rasmussen, Denver, Colo.

Application March 29, 1938, Serial No. 198,733

4 Claims. (Cl. 107—7)

This invention relates to a flour dusting machine and has for its principal object the provision of a device of this character for use in large bakeries for dusting pans or cracker aprons and the like with flour to prevent sticking of the cookies, crackers, and other bakery goods thereto.

Another object of the invention is to so construct the device that it can be easily applied to the pan conveyor of the forming machine so as to continuously operate to place a fine, thin, uniform coating of flour over the full width of the pans or aprons as they pass the machine.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side view of the improved dusting machine with the flour hopper cover and brush guard removed.

Fig. 2 is an enlarged detail view illustrating the design of the grooves in the roller cylinder.

Fig. 3 is a cross section through the machine taken on the line 3—3, Fig. 1.

Fig. 4 is an end view thereof.

In the drawings, the side frame members of a typical pan conveyor are indicated at 10, the pan conveyor at 11, the pans at 12.

The invention employs two, inverted U-shaped, side frames 13 spaced-apart a distance equal to the spacing of the side members 10 of the conveyor by means of a spacing bar 14 and an angle bar 15. The angle bar is turned so that its open side extends upwardly to form a trough or hopper. The legs of the frames 13 are turned outwardly to form feet 16 which are perforated to fit over suitable locating pins 17 projecting upwardly from the conveyor members 10.

Each frame 13 is provided with suitable journal boxes 18 for supporting a brush shaft 19 and a roller shaft 20 in parallel relation. A roller cylinder 21 is mounted upon the roller shaft 19 by means of suitable circular end plates 22. A brush core 23 is mounted on the brush shaft 20 and provided with a cylindrical brush 24 of stiff resilient bristles.

The shafts 19 and 20 are so spaced that the brush 24 will contact the roller cylinder 21 so as to flex the bristles of the brush.

The roller cylinder 21 is formed with a series of shallow, parallel, spaced-apart grooves 25. Each groove having a ratchet-like shape, that is, one side of the groove is inclined and the other side is cut straight, as shown in Fig. 2. The relation of the grooved side is such that at the point of contact of the brush the inclined side is directed downwardly, whereas, the straight side is across the top of the groove.

A relatively long, flour hopper 26 extends along the full length of the top of the roller cylinder 21, the latter forming a bottom in the reservoir. The hopper is supported from the side frame 13 upon bracket arms 41. The top of the hopper is closed by means of a suitable hinged lid 27.

Within the hopper is a rotating agitating cage 28 preferably consisting of a hollow skeleton of parallel bars mounted upon an agitating shaft 29.

A weighted press roll 30 rides against the roller cylinder 21 in the bottom of the hopper 26. The press roll 30 is held in place simply by gravity and is guided between vertical guide members 31 on the end walls of the hopper 26.

At the discharge side of the hopper is a scraper 32 secured to the hopper side wall by means of suitable adjustable wing nuts 33. The scraper is so adjusted that it frictionally engages the roller 21. At the opposite side of the hopper, where the roller 21 enters, is a rotating valve rod 34 which also rests by gravity against the roller cylinder.

The brush shaft is driven from any desired source of power by means of a suitable drive belt or chain 35. The roller shaft 20 is driven from the brush shaft through the medium of a suitable drive chain 36 and gears 37 so that the roller shaft 20 will rotate at a much slower speed than the brush shaft. The agitator shaft 29 is driven from the roller shaft, and preferably at the same speed, by means of a chain 38 and sprockets 39. The rollers 30 and 34 are simply driven by their contact with the roller cylinder 21. The brush is preferably protected by means of a suitable cover 40.

*Operation*

The roller shaft 20 is driven at a speed of approximately eight revolutions per minute. This causes the brush to rotate at a speed of approximately fifty revolutions per minute. The hopper is filled with flour. The flour flows into the grooves 25 and as these grooves pass under the press roll 30, the flour is packed compactly into the grooves. As the roller passes under the scraper 32, all excess flour is scraped from the surface of the roller and the roller emerges from the machine in a clean, bright condition except for the packed flour in the grooves 25. The rapidly rotating brush bristles sweep the flour from the grooves, in the direction of the inclined sides of the latter, delivering it to the pans 12 in a smoke-like cloud which settles upon the pans as they pass beneath in a uniform, evenly distributed dust-like film.

It is desired to call attention to the fact that the side of the hopper where the roller surface is spaced above the roller so that any adhering flour may pass under without being scraped off. The rod 34 allows any incoming flour to pass thereunder but prevents the flour in the hopper from flowing out at this point.

The flour tends to flow upwardly in the hopper back of the scraper and would soon all pile along the front of the hopper. This is prevented, however, by the rotating agitator which keeps the flour uniformly distributed throughout the box.

While it has been formed that the straight parallel grooves in the roller cylinder operate much more efficiently than any other type of groove, it is conceivable that other types of pockets or depressions could be employed if desired.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A flour dusting machine comprising: an open-bottomed flour hopper; a roller closing the open bottom thereof; depressions in said roller for receiving flour from said hopper; a free, unsupported weighted press roll in said hopper lying upon said roller and acting to press flour into said depressions; a scraper in said hopper contacting said roller as it leaves said hopper for removing flour from the surface of said roller and allowing it to remain in said depressions; a rotary brush for sweeping the flour from said depressions; and means for rotating said brush and said roller.

2. A flour dusting machine comprising: an open-bottomed flour hopper; a roller closing the open bottom thereof; a cylindrical brush contacting the surface of said roller; means for driving said brush at a higher speed than said roller to brush the adhering flour therefrom; and a free, rotating cylindrical valve lying by gravity upon said roller where it enters said hopper to allow adhering flour on said roller to enter said hopper and to prevent flour from discharging from said hopper.

3. A flour dusting machine for bakeries comprising: a pair of supporting frames; a brush shaft extending between said frames and said bearings; a cylindrical brush mounted on said brush shaft; a roller shaft extending between said frames and mounted in said bearings; a cylindrical roller mounted on said roller shaft; an open bottomed flour hopper supported over said cylindrical roller, the latter forming a bottom in said hopper; means for rotating said roller toward said brush; means for rotating said brush toward said roller at a higher speed than the rotation of said roller, said roller being provided with minute, ratchet-shaped grooves for receiving flour from said hopper; a scraper member in said hopper contacting said roller for removing flour from the surface of said roller between said grooves; a weighted full, unattached press roll in said hopper lying by gravity upon said cylindrical roller for pressing flour into said grooves; and a freely rotating cylindrical rod lying by gravity upon said roller where it enters said hopper to prevent the flour from flowing from said hopper.

4. A flour dusting machine comprising: an open-bottomed flour hopper; a roller closing the open bottom thereof; depressions in said roller for receiving flour from said hopper; each of said depressions having one of its sides inclined in the direction of movement of said brush, the other side thereof lying in a radial plane; a free, unsupported, weighted press roll in said hopper lying upon said roller and acting to press flour into said depressions; a scraper in said hopper contacting said roller as it leaves said hopper for removing flour from the surface of said roller and allowing it to remain in said depressions; a rotary brush for sweeping the flour from said depressions; and means for rotating said brush and said roller.

PETER RASMUSSEN.